J. CLEGG.
PROCESS AND MEANS FOR EVAPORATION OF SYRUPS.
No. 173,270. Patented Feb. 8, 1876.
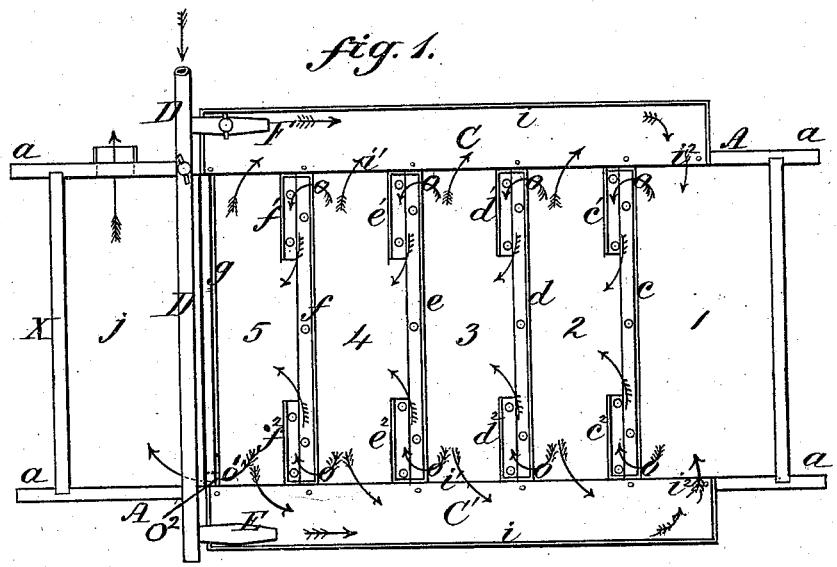
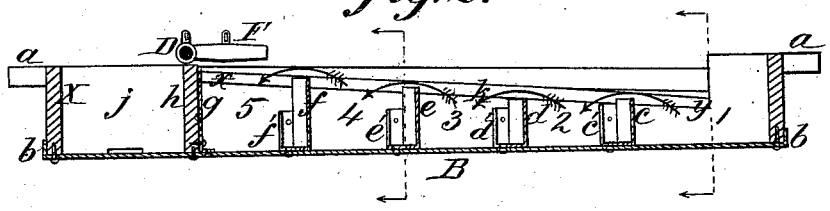
Witnesses:
Inventor:
James Clegg,
by Johnson and Johnson,
his Attorneys.

UNITED STATES PATENT OFFICE.

JAMES CLEGG, OF ALMOND, ALABAMA.

IMPROVEMENT IN PROCESSES AND MEANS FOR EVAPORATION OF SIRUPS.

Specification forming part of Letters Patent No. 173,270, dated February 8, 1876; application filed December 15, 1875.

*To all whom it may concern:*

Be it known that I, JAMES CLEGG, of Almond, in the county of Randolph and State of Alabama, have invented a new and useful Improvement in Sirup-Pan, of which the following is a specification:

The object of my invention is to furnish to sirup manufacturers a pan for evaporating or automatically skimming and making sirup from the crude cane-juice, which shall be simple and cheap in construction, self-operating to save labor and expense, and hastening and perfecting the process, whereby many advantages over the ordinary devices and methods are obtained.

The invention consists, principally, in the particular manner in which the juice is automatically manipulated by the pan, when boiling, in evaporating or skimming the same, and in causing the supply of crude juice to return the scum to the first space in the pan, by means of which the most important advantages are gained in saving of time and expense, and resulting in producing a superior article of sirup, more pure than that which is now furnished. It also consists in the construction of the pan proper.

Like letters of reference indicate like parts wherever they occur upon the various figures of the drawings.

Figure 1 represents a top view of a sirup-pan embracing my invention; Fig. 2, a vertical longitudinal section, and Fig. 3 a cross-section.

The frame-work A of my pan is composed of wood, and is of rectangular form, and has at each of its four corners suitable handles $a$, formed by extending the side strips, which serve as hand-holds to raise or lower the pan on or off the furnace, upon which it is to rest. This wooden frame is provided with a suitable copper or metal bottom, B, made from one solid piece, and sufficiently long and wide to permit its outer-side edges and ends to be turned upward, forming flanges $b$, which rest against the outer sides of the wooden frame, inclosing the same in the pan, and serving as a means through which tacks may be driven horizontally to secure the bottom to the wooden side pieces, or, if desired, the bottom tacks, driven from beneath up through the bottom into the side pieces, the object being to make a tight joint to prevent leakage. The sides of the pan are of uniform height, and the pan proper of equal depth throughout, being somewhat shallow. Situated in this pan at suitable intervals are arranged four (more or less) transverse copper, metal, or wooden partitions, bars, or strips, $c\ d\ e\ f$, which are placed parallel to each other, and cross and divide the pan into five (more or less) apartments or spaces, 1, 2, 3, 4, and 5. These strips, if of metal, are secured to the bottom B by riveting or soldering, making a tight joint between the two, and have a flange turned along the bottom, to facilitate their being thus fastened and kept upright. The ends of each of these partitions are turned horizontally to a right angle to rest against the internal sides of the frame, where, by means of rivets or otherwise, the ends are firmly attached to the sides, making a tight joint.

The partitions, commencing with $c$, are of different heights, gradually increasing, as shown, to partitions $f$, the one, $c$, being first and the lowest, and perhaps not more than an inch in height throughout, while the next, $d$, is somewhat higher—say, one and one-half inch high—and so on, increasing to the last, or $f$.

Midway between the partition $f$ and the end X of the pan is secured in like manner to the partitions a narrow copper strip, $g$, which crosses the pan. To the rear of this strip a wooden cross-piece, $h$, is secured, which divides the pan and rests on the bottom of the same, and extends upward flush with the sides, having its ends mortised or duffed into the sides to form tight joints.

Arranged in the rear of each of the partitions, and near them at each end, and running parallel thereto, are two short upright copper strips, $c^1\ c^2\ d^1\ d^2\ e^1\ e^2\ f^1\ f^2$, which serve as abutments or guides, and are secured to the bottom B, and at their sides to the frame, in like manner to the partitions referred to above, and may be uniform or graduated in height. Upon the upper edge of each of the side frames, and running longitudinally therewith, is arranged a flat and wide copper or metal trough or spout, C C', the side frames being cut away to receive and support them. The frame upon either side where cut away, as at $k$, is left higher at the point $x$ than at $y$, and gradually descends from $x$ to $y$, so that the trough, when secured thereon, corresponds in its inclination, descending from $x$ to $y$. The inner edges of these troughs are turned downward, as at $l$, and are riveted to the internal upper surfaces of the frames, for keeping the troughs securely in position. The flat portion extends laterally over the outside of the frames, and the outer sides and edges are turned upward to prevent the sirup or scum from running over outside of the pan.

The side frames where cut away are beveled outward, so that the outer edges or sirup-channels $i$ of the troughs are held somewhat depressed below the inner edges or ridges $i^1$, the channel $i$ gradually returning from the depressed position to the horizontal and level position, as shown at the exit $i^2$, whereby the sirup is caused to run along the channels, and finally flow therefrom at exit $i^2$ into the first space 1.

At the lower corners, and at the ends of each of the partitions $c\ d\ e\ f$, are provided apertures $o$, which serve to permit the juice as it boils to escape and flow from first space to the second, and so on to finishing-space 5. At one of the lower corners of the cross-piece $h$ or strip $g$ is also provided an aperture, $o^1$, through which the pure and finished article of sirup is permitted to automatically and continuously, or at will of operator, enter the finishing-space $j$ when at proper consistency. The flow at this point is regulated by a suitable gate, $o^2$, Fig. 1, which slides up and down in space 5, opening or closing the said aperture $o^1$, whereby, from time to time, the sirup is drawn off.

Situated over or resting upon the end of the pan where the evaporating process is finished is a metal or wooden tube, D, which extends across the pan and to the reservoir or supply-stand at one side, where the juice is kept. Through this pipe the juice runs to the two branch tubes E F, arranged at right angles to the main pipe D, for feeding the crude juice to the pan.

The pipe E at the end of the tube D is arranged over one of the troughs, so that the juice flowing therefrom will fall into the trough. The pipe F is arranged in like manner over the other trough. The main tube and branch tube F are each provided with thumb cut-offs, whereby the flow of juice is controlled at will by being shut off from one or both branch pipes, or increased or diminished, as may be desired.

The pan being arranged upon the furnace, sufficient juice is poured into the spaces to cover the bottom when the fire is started under the pan and the juice begins to boil. It is then permitted to flow slowly and gradually from supply-pipe into the pan, in the manner referred to above. As the juice is fed to the pan at space 1, it becomes heated and boils therein, and changes its consistency or character, and flows therefrom through the openings $o$ at the sides and strikes the guides in the next apartment, whereby the two oppositely-entering streams are caused to converge or flow together at the center of the pan in each apartment, from each side, and then spread or diverge to leave the space as before. Thus a double stream, or a stream of two currents, is formed in each space, and the sirup is evenly disposed over the bottom in each, and makes its exit, as before, when of the proper consistency to flow out of the apertures, thus proceeding in like manner, until it finally enters the finishing-space $j$. By thus directing the juice to the sides, and then to the center, of the pan, in two streams, instead of taking a single stream in a circuitous or zigzag course, as is commonly done, I hasten the boiling of the juice, and rapidly change it from one apartment into another when it is in proper condition, giving room for a constant new supply. The juice in the pan, as it boils, causes the scum to rise, and is naturally conveyed or thrown thereby into the side troughs, some of the scum, perhaps, rising and passing over the graduated partitions into the spaces toward the finishing-space. Now the crude juice, as it flows from the supply-tank, runs along the channels $i$ in the troughs to the commencing end or space 1. It carries the scum back to the same space of the pan continually, where it may be removed by a skimmer, when necessary. As the scum is thrown to the troughs laterally, instead of being carried to the finishing end and uniting with the pure sirup, the latter is kept free from dirt, and skimming made unnecessary, save in the first space of the pan. Moreover, the scum or blubbers, as they come in contact with the cold crude juice in the troughs in flowing to space 1, are burst and their steam condensed, and the juice therein, or saccharine matter therefrom, is taken up by the cold juice, whereby a great saving of sirup is automatically accomplished.

By this new supply of juice and return of scum the pan is entirely prevented from boiling over. As the cross-bar $h$ is of wood, and arranged higher than the partitions, the scum is prevented from entering the space $j$, where the pure sirup is deposited, which is of itself a matter of vast importance in sirup-manufacture, saving inconvenience and labor.

The juice in space 1 is generally the coolest, and, as it cooks, passes into the next space, where it is much hotter, and so on throughout, whereby there can be no escape backward of the juice, but must end in reaching the space $j$, where it can be drawn up at will.

It is obvious that the frame and bottom of my pan may be very differently constructed, as well as some of the other parts, without departing from the spirit of my invention.

I claim—

1. The process herein described, in the manufacture of sirup, consisting in automatically removing the scum, and returning the same through the channel for and together with the crude juice.

2. The pan A B, provided with partitions $c$ $d$ $e$ $f$, having severally an opening, $o$, at each end, in combination with the side troughs $i$, inclined in two directions, and communicating with the apartments 1, as described.

3. The pan A B, provided with partitions $c$ $d$ $e$ $f$, each having openings $o$ and guides $c^1$ $c^2$ $d^1$ $d^2$ $e^1$ $e^2$ $f^1$ $f^2$, in combination with the inclined troughs $i$, as described.

4. The pan A B, provided with graduated partitions, and having apertures $o$, in combination with the guides and side troughs and space $j$, formed by cross-bar $h$, as described.

5. The combination of the supply-tubes D E F, having the cut-offs, and a pan, A B, provided with partitions having openings and side troughs connecting with the apartments 1, as described.

In testimony that I claim the foregoing I have affixed my signature in the presence of two witnesses.

JAMES CLEGG.

Witnesses:
A. J. DRIVER,
M. W. BARBER.